W. H. ISAACS & G. E. BANNER.
SULKY PLOW.
No. 86,231. Patented Jan. 26, 1869.
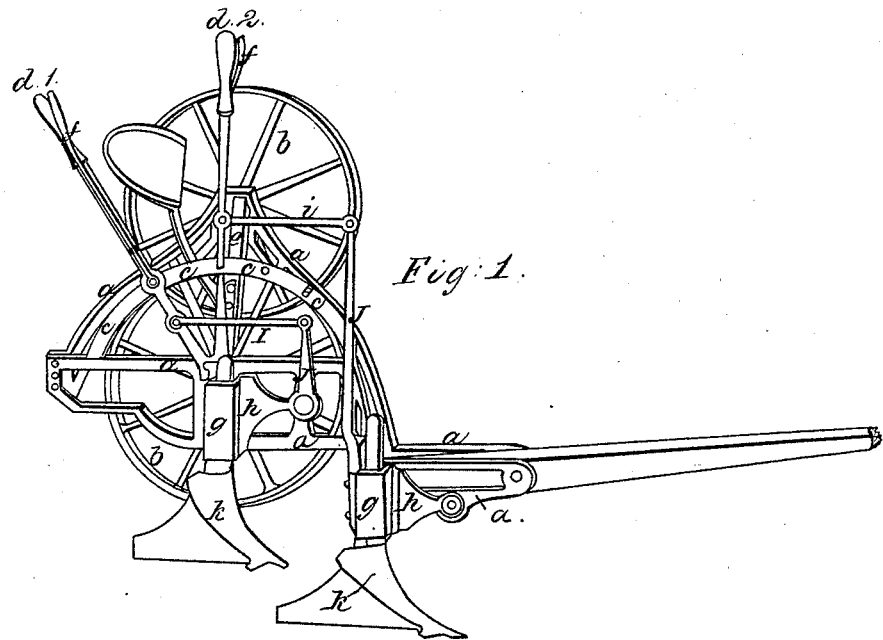
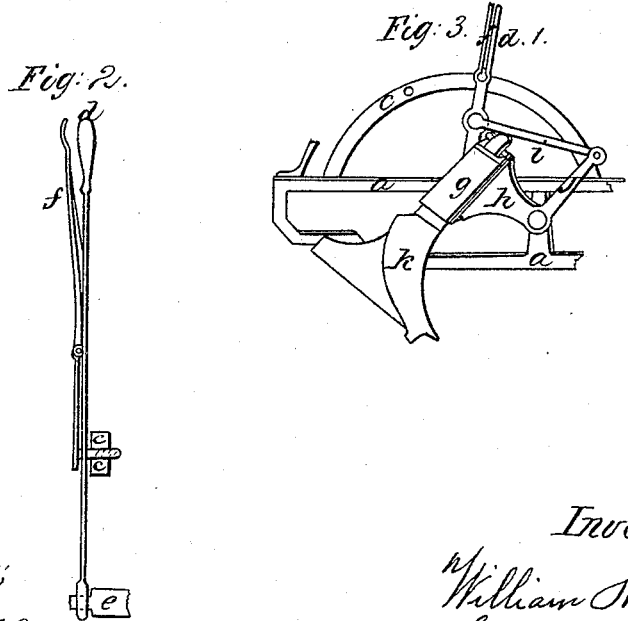

WILLIAM HENRY ISAACS, OF TERRE HAUTE, INDIANA, AND GEORGE EDWARD BANNER, OF NEWARK, NEW JERSEY.

Letters Patent No. 86,231, dated January 26, 1869.

IMPROVEMENT IN SULKY-PLOWS.

The Schedule referred to in these Letters Patent and making part of the same.

*To all whom it may concern:*

Be it known that we, WILLIAM HENRY ISAACS, of Terre Haute, in the State of Indiana, and GEORGE EDWARD BANNER, of the city of Newark, in the State of New Jersey, have made certain Improvements in Sulky-Plows; and we do hereby declare the following to be a full and exact description of the same, reference being had to the drawings accompanying this specification as part of the same.

The nature of our improvements consists in so constructing a sulky-plow that the draught of the team shall be in the line of the furrows, not all on one side. the plows being forward of the axle and outside of the wheels; also, in the manner of construction and connection of the lever or levers, which only require releasing from their hold to allow the plows to come out of the work, without any backing of the team, or lifting by the plowman, the plows being so attached to the frame as to turn out of the ground, by the forward movement of the team, when the levers are released from their hold.

The frame of the plow, shown by $a$, in the drawings, is of wood or iron, as may be chosen, and is supported by the two wheels $b\ b$, one of which is inside the frame $a$.

On that end of the frame next to the wheel, inside of the frame, is a segment, or semicircle, $c$.

The levers $d^1$ and $d^2$, having fulcrum on the axle $e$, have each a stout pin passing through them, said pins being attached to the small levers $f$, that have their fulcra on the large levers, $d^1$ and $d^2$, (see Figure 2,) the pins entering and being securely held in position by entering the semicircle $c$.

Sockets, with an arm cast fast thereto, are attached to the frame $a$ by strong bolts, upon which the arm and socket turn.

$g$ shows the socket.

$h$ shows the arms.

Connecting-rods $i$, from the levers $d$, are held by movable joints to the top of upright levers $j$, the levers $j$ being secured either to the arm $h$, on the socket $g$, as at $d^1$, or on the back of the socket $g$, as at $d^2$.

The plows, $k$, are held in position by their stems passing through and being wedged fast in the socket $g$.

It will be seen that the plows are drawn, in their work, by the stout bolts at the ends of the arms $h$, on the sockets $g$, and are held stationary by the levers and connecting-rods, by means of the pins on the levers $f$, and the holes or catches in the semicircle $c$, and that, as soon as the pin is released from the semicircle, the plow can turn out of the ground backwards, as shown in Figure 3, and by the hand of the driver can then be lifted and held clear of the ground, holes or catches being provided for that purpose, in proper places on the semicircle $c$.

The seat of the driver is, as usual, attached to the axle.

Right or left-handed plows can be used with equal facility.

One or more plows can be used in the frame, as the varied nature of soils requires or admits, and two plows, one right and the other left, can be employed in side-hill plowing, as the construction of separate sockets and levers for each plow allows of using either plow separately and alone, at choice.

By placing the plows outside the wheels and frame, the draught of the team can be in the line of the work.

What we claim as our improvements, and desire to secure by Letters Patent, is—

The construction, combination, and arrangement of the plows $k$, arms $h$, with sockets $g$, as constructed, and attached by pivots to outside of frame, levers $j$, connecting-rods $i$, levers $d^1\ d^2$, having spring-levers $f$ attached, semicircle $c$, and frame $a$, as constructed.

WILLIAM H. ISAACS.
GEORGE E. BANNER.

Witnesses:
W. M. GOODING,
SIDNEY N. EDWARDS.